United States Patent Office 2,838,523
Patented June 10, 1958

2,838,523

PRODUCTION OF TETRAHYDROFURFURYL ALCOHOL

Andrew P. Dunlop, Riverside, and Horst Schegulla, Chicago, Ill., assignors to The Quaker Oats Company, Chicago, Ill., a corporation of New Jersey No Drawing. Application June 10, 1954
Serial No. 435,928

9 Claims. (Cl. 260—347.8)

This invention relates to a hydrogenating process and more particularly to a process for hydrogenating the ring structure of a compound having the furan nucleus.

A number of processes have been suggested in the prior art for the preparation of tetrahydrofurfuryl alcohol by catalytic hydrogenation of furfural or furfuryl alcohol. However, all of these processes have certain disadvantages with respect to ultimate yields obtained or to commercial feasibility. Thus many of them have involved hydrogenation under high pressure necessitating the provision of specially designed heavy and expensive equipment. Also such procedures have resulted in a product which is incompletely hydrogenated thus containing not inconsiderable quantities of incompletely hydrogenated material, principally furfuryl alcohol, as well as certain by-products such as methyltetrahydrofuran, pentanols, pentanediols and others.

It is an important object of this invention to provide a process for preparing tetrahydrofurfuryl alcohol in high yields.

A further object of this invention is the provision of a commercially feasible process for producing tetrahydrofurfuryl alcohol of high purity.

A still further object of this invention is the provision of a truly continuous process for hydrogenating furfural or furfuryl alcohol under conditions such that tetrahydrofurfuryl alcohol may be readily and cheaply prepared.

A still further object of this invention is the provision of a process of producing tetrahydrofurfuryl alcohol which is essentially free of furfuryl alcohol.

Further and additional objects will appear from the following description and the appended claims.

Contrary to prior art indications, we have now discovered that furfural or furfuryl alcohol can be converted to tetrahydrofurfuryl alcohol in very high yields by direct hydrogenation in the vapor state at pressures not substantially in excess of atmospheric in the presence of a nickel type catalyst. In order to obtain high yields, the temperature should be maintained below about 120° C. and preferably below about 105° C. The lower temperature limit is not fixed, since it may be at any temperature at which the hydrogenation reaction will occur. For example, temperatures as low as 75° C. have been employed in order to effect complete hydrogenation. Generally speaking, any temperature at which the hydrogenation reaction will occur below about 120° C. and preferably below about 105° C. will be satisfactory. It has been found that at temperatures above about 105° C. and particularly above about 120° C. hydrogenolysis begins to occur, resulting in the rupture of one or more of the several C—O linkages leading to the formation of undesired hydrogenolysis products such as methyltetrahydrofuran, pentanols, pentanediols, and the like.

The reaction is carried out in the vapor phase and preferably in the presence of a stoichiometric excess of gaseous hydrogen which may or may not be diluted with an inert gas such as nitrogen. The pressure that is employed is not substantially in excess of atmospheric pressure and ordinarily the pressures that are used in the process are only those that are incident to moving the vaporous reactants through the catalyst bed. Thus by the term "not substantially in excess of atmospheric" pressure is meant to include those higher pressures which may in certain cases be as high as 2 or 3 atmospheres, it being recognized that the process of this invention is essentially a low pressure operation and that moderate higher pressures could be employed incident to moving the reaction products through the reaction chamber without departing from the spirit and scope of this invention.

The catalyst employed for carrying out the reaction is a nickel type catalyst and is preferably a reduced nickel catalyst. The reduced nickel may be used as such or it may be supported on any suitable support, such as kieselguhr, alumina, pumice, Alundum, charcoal or the various natural or synthetic clay-like supports that are well known to the art. In addition the catalyst composition may be modified, if desired, to incorporate certain basic substances, such as sodium silicate, calcium oxide, magnesium oxide, or the like.

For a further understanding of this invention, reference will now be made to several specific examples of producing tetrahydrofurfuryl alcohol. However, it will be appreciated that the invention is not to be limited thereto since various modifications may be made without departing from the spirit and scope of this invention.

*Example 1*

A catalyst was prepared by precipitating nickel hydrate on kieselguhr. The resulting solid was tableted as ⅛ inch pellets, reduced with hydrogen at about 400° C. and then stabilized by partial reoxidation until ready for use. In this form the catalyst contained about 60% nickel with a ratio of reduced nickel to total nickel of about 55%. About 600 grams of the partially reduced pellets were introduced into a catalyst chamber and reduced in a stream of hydrogen containing gas. The reducing gas initially contained 5% hydrogen and 95% nitrogen with the concentration being progressively enriched to 100% hydrogen in order to control the temperature during reduction of the catalyst below 250° C. After the catalyst had been completely reduced and the temperature thereof lowered to less than 120° C., then furfuryl alcohol was vaporized into a stream of preheated hydrogen by introducing furfuryl alcohol into a mass of glass wool through which the preheated hydrogen was passed. The resulting mixture of hydrogen and furfuryl alcohol was then passed through the catalyst bed as a vapor. The operating pressure was about 1 to 2 pounds per square inch gauge, which was just enough to cycle the vapor through the system. The vapor stream emerging from the catalyst chamber was passed through a condenser and into a chilled flask to condense the reaction products. The unreacted hydrogen was recycled to the system after preheating.

The foregoing process was carried out under conditions wherein the furfuryl alcohol was fed at a rate of 0.25 grams per minute, the hydrogen was cycled at the rate of 6 liters per minute, and the temperature of the reaction chamber was maintained between 81° and 84° C. The conversion of the furfuryl alcohol to tetrahydrofurfuryl alcohol was substantially complete with the condensate containing about 99% tetrahydrofurfuryl alcohol. No furfuryl alcohol was present in the product. When the flow rate of the hydrogen was increased to 15 liters per minute and the temperature was raised to between 90° and 101° C., the yield of tetrahydrofurfuryl alcohol was still about 95% with no furfuryl alcohol being present in the product. However, as the temperature is increased above 105° C., and particularly above 120° C., the ultimate yield of tetrahydrofurfuryl alcohol decreases markedly and considerable hydrogenolysis occurs, resulting in the production of by-products indicated heretofore.

*Example 2*

This example was essentially the same as Example 1 except that the catalyst contained about 20% (dry basis) of sodium silicate, the feed of furfuryl alcohol was at the rate of 0.4 cc. per minute and the hydrogen was cycled at the rate of 5 liters per minute. Under these conditions a high quality product consisting essentially of tetrahydrofurfuryl alcohol was obtained when the temperature was held below about 105° C. However, the reaction product using the particular catalyst contained a small percentage of furfuryl alcohol as an undesirable contaminant.

*Example 3*

This example is essentially the same as Example 1 except the furfural was charged as a feed stock in place of furfuryl alcohol. The temperature of the catalyst bed was maintained between 95 to 100° C. with a hydrogen cycle rate of about 16 liters per minute and a furfural feed rate of 0.2 gram per minute. The liquid product discharged from the process was water white in color and contained about 95% tetrahydrofurfuryl alcohol which was free of furfuryl alcohol. In the process of this example the furfural is presumably first hydrogenated to furfuryl alcohol and then the furan ring is hydrogenated to produce the tetrahydro derivative.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A low pressure process of producing tetrahydrofurfuryl alcohol which comprises contacting a compound selected from the group consisting of furfural and furfuryl alcohol in the vapor state with a gas containing a stoichiometric excess of free hydrogen at a hydrogenating temperature below about 120° C. in the presence of a nickel catalyst.

2. A process of producing tetrahydrofurfuryl alcohol which comprises contacting a compound selected from the group consisting of furfural and furfuryl alcohol in the vapor state with a gas containing a stoichiometric excess of free hydrogen at a pressure not substantially in excess of atmospheric and at a hydrogenating temperature below about 120° C. in the presence of a reduced nickel catalyst.

3. A process of producing tetrahydrofurfuryl alcohol of high purity which comprises contacting in the vapor phase a compound selected from the group consisting of furfural and furfuryl alcohol with a gas containing a stoichiometric excess of free hydrogen at a pressure not substantially in excess of atmospheric and at a hydrogenating temperature below about 105° C. in the presence of a reduced nickel catalyst.

4. A process of producing tetrohydrofurfuryl alcohol of high purity which comprises passing a vaporous mixture of furfuryl alcohol and a stoichiometric excess of hydrogen over a reduced nickel catalyst at a hydrogenating temperature below about 105° C. at a pressure not substantially in excess of atmospheric.

5. A process of hydrogenating furfural to produce tetrahydrofurfuryl alcohol which comprises passing a vaporous mixture of furfural and a stoichiometric excess of hydrogen over a reduced nickel catalyst at a hydrogenating temperature below about 105° C. at a pressure not substantially in excess of atmospheric.

6. A low pressure process of producing tetrahydrofurfuryl alcohol which comprises contacting a compound selected from the group consisting of furfural and furfuryl alcohol in the vapor state with a gas containing a stoichiometric excess of free hydrogen at a hydrogenation temperature below about 120° C. in the presence of a nickel catalyst which has been reduced at a temperature below about 400° C., reoxidized by passing a gas containing free oxygen over the reduced catalyst, and again reduced by passing a gas thereover containing free hydrogen at a temperature below about 250° C.

7. A low pressure process of producing tetrahydrofurfuryl alcohol which comprises contacting a compound selected from the group consisting of furfural and furfuryl alcohol in the vapor state with a gas containing a stoichiometric excess of free hydrogen at a hydrogenation temperature below about 120° C. in the presence of nickel hydrate which has been reduced at a temperature below about 400° C., partially reoxidized by passing a gas containing free oxygen thereover, and again reduced by passing a gas thereover containing free hydrogen at a temperature below about 250° C.

8. A low pressure process of producing tetrahydrofurfuryl alcohol which comprises contacting a compound selected from the group consisting of furfural and furfuryl alcohol in the vapor state with a gas containing a stoichiometric excess of free hydrogen at a hydrogenation temperature below about 120° C. in the presence of a nickel catalyst which has been reduced at a temperature below about 400° C., partially reoxidized by passing a gas containing free oxygen thereover until the ratio of reduced nickel to total nickel was about 55 percent, and again reduced by passing a gas thereover containing free hydrogen at a temperature below about 250° C.

9. A low pressure process of producing tetrahydrofurfuryl alcohol which comprises contacting a compound selected from the group consisting of furfural and furfuryl alcohol in the vapor state with a gas containing a stoichiometric excess of free hydrogen at a hydrogenation temperature below about 120° C. in the presence of a nickel catalyst which has been reduced at a temperature below about 400° C., partially reoxidized by passing a gas containing free oxygen thereover until the ratio of reduced nickel to total nickel was about 55 percent, and again reduced by passing a gas thereover intially containing 5 percent hydrogen and 95 percent nitrogen, said hydrogen content having been progressively increased to 100 percent, whereby the temperature of the latter reduction step was maintained below about 250° C.

References Cited in the file of this patent

UNITED STATES PATENTS

| 2,077,422 | Lazier | Apr. 20, 1937 |

FOREIGN PATENTS

| 555,405 | Germany | July 23, 1932 |
| 337,296 | Great Britain | Oct. 30, 1930 |

OTHER REFERENCES

Hilly: Bull. Soc. Chim. [5] 4, p. 1630 (1937).
Kaufmann: JACS 55, 3029–44 (1923).
Dunlap: "Furans" (1950), Reinhold Pub. Co., page 697.